United States Patent
Lee et al.

(10) Patent No.: US 7,912,005 B2
(45) Date of Patent: Mar. 22, 2011

(54) METHOD AND APPARATUS FOR CONFIGURING DOWNLINK FRAME IN A COMMUNICATION SYSTEM

(75) Inventors: Hee-Kwang Lee, Anyang-si (KR); Jung-Won Kim, Seoul (KR); Seung-Joo Maeng, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 643 days.

(21) Appl. No.: 12/021,712

(22) Filed: Jan. 29, 2008

(65) Prior Publication Data

US 2008/0181175 A1    Jul. 31, 2008

(30) Foreign Application Priority Data

Jan. 29, 2007    (KR) .................. 10-2007-0009052

(51) Int. Cl.
*H04W 4/00* (2009.01)
(52) U.S. Cl. ........................................ 370/329
(58) Field of Classification Search .................. None
See application file for complete search history.

(56) References Cited

U.S. PATENT DOCUMENTS

| | | | |
|---|---|---|---|
| 2007/0060145 A1 | 3/2007 | Song et al. | |
| 2007/0060146 A1 | 3/2007 | Won et al. | |
| 2007/0140165 A1* | 6/2007 | Kim et al. | 370/329 |
| 2007/0274253 A1* | 11/2007 | Zhang et al. | 370/328 |

FOREIGN PATENT DOCUMENTS

| | | |
|---|---|---|
| EP | 1 207 647 | 5/2002 |
| EP | 1 575 205 | 9/2005 |
| KR | 1020060065790 | 6/2006 |
| KR | 1020070010597 | 1/2007 |
| KR | 1020070011030 | 1/2007 |
| WO | WO 2006/071049 | 7/2006 |

* cited by examiner

*Primary Examiner* — Anh-Vu Ly
(74) *Attorney, Agent, or Firm* — The Farrell Law Firm, P.C.

(57) ABSTRACT

A method and apparatus for configuring a downlink frame in a communication system is provided. The method and apparatus includes determining a first transmission Protocol Data Unit/Packet Data Unit (PDU) to be transmitted according to a scheduling priority, variably determining an amount of a data burst by calculating a sub-channel axis size of a first sub-region and a number of slots to be allocated in the first sub-region in an accumulated manner when the first PDU is allocated in the first sub-region, determining a size of a MAP region according to an amount of the data burst; setting up the MAP region in a downlink frame region according to the determined size of the MAP region including allocation information of a data burst, and transmitting the data burst over a data burst allocation region set up in a remaining region except for the MAP region in the downlink frame region, wherein the data burst includes at least one PDU having the same Modulation and Coding Scheme (MCS) level, or is a data burst generated by concatenating PDUs of a same Mobile Station (MS), wherein the data burst allocation region includes a non-Hybrid Automatic Retransmit reQuest (non-HARQ) region and HARQ region, the non-HARQ region is used for transmitting non-HARQ data bursts, the HARQ region is used for transmitting non-HARQ data bursts, and the first sub-region is non-HARQ region or HARQ region.

39 Claims, 9 Drawing Sheets

METHOD AND APPARATUS FOR CONFIGURING DOWNLINK FRAME IN A COMMUNICATION SYSTEM

PRIORITY

This application claims priority under 35 U.S.C. §119(a) to a Korean Patent Application filed in the Korean Intellectual Property Office on Jan. 29, 2007 and assigned Ser. No. 2007-9052, the disclosure of which is hereby incorporated by reference.

BACKGROUND OF THE INVENTION

1. Field of the Invention

The present invention generally relates to a communication system, and in particular, to a method and apparatus for configuring a downlink frame in a communication system.

2. Description of the Related Art

The next generation communication systems are developing to provide services having various Quality-of-Service (QoS) classes to Mobile Stations (MSs). A communication system based on Institute of Electrical and Electronics Engineers (IEEE) 802.16, referred to herein as an IEEE 802.16 communication system, is a typical example of a next generation communication system. For convenience, the following description will be made with reference to an IEEE 802.16 communication system.

Data transmission of an IEEE 802.16 communication system is achieved on a frame-by-frame basis, and each frame is divided into a Downlink (DL) frame, which is a region over which DL data can be transmitted, and an Uplink (UL) frame, which is a region over which UL data can be transmitted. The UL and DL frame regions each are divided in units of slots, which are 2-dimensional resources defined by the frequency domain (or frequency axis) and the time domain (or time axis).

A Base Station (BS) transmits DL data burst allocation information for an MS over a DL-MAP region of a DL frame. The DL frame includes a DL data burst allocation region, and the DL data burst allocation region occupies a plurality of time slots for DL data bursts to be transmitted. For example, in an IEEE 802.16 communication system, the BS, when allocating DL resources, records allocation information of the corresponding DL resources in a DL-MAP region having a fixed size.

Therefore, the conventional BS uses a fixed number of DL-MAP Information Elements (IEs) regardless of the size of the data burst allocation region and the number of data bursts to be allocated, causing a decrease in the resource utilization and efficiency.

SUMMARY OF THE INVENTION

The present invention substantially addresses at least the above-described problems and/or disadvantages and provides at least the advantages described below. Accordingly, an aspect of the present invention is to provide a frame configuring method and apparatus for maximizing resource utilization and efficiency in a communication system.

Another aspect of the present invention is to provide a method and apparatus for variably estimating a MAP size according to an amount of data burst to be allocated, thereby maximizing utilization of wireless resources.

According to an aspect of the present invention, there is provided a method for configuring a downlink frame in a communication system. The method includes determining a first transmission Protocol Data Unit/Packet Data Unit (PDU) to be transmitted according to a scheduling priority, variably determining an amount of a data burst by calculating a sub-channel axis size of a first sub-region and a number of slots to be allocated in the first sub-region in an accumulated manner when the first PDU is allocated in the first sub-region, determining a size of a MAP region according to an amount of the data burst, setting up the MAP region in a downlink frame region according to the determined size of the MAP region including allocation information of a data burst, and transmitting the data burst over a data burst allocation region set up in a remaining region except for the MAP region in the downlink frame region, wherein the data burst includes at least one PDU having the same Modulation and Coding Scheme (MCS) level, or is a data burst generated by concatenating PDUs of a same Mobile Station (MS), wherein the data burst allocation region includes a non-Hybrid Automatic Retransmit reQuest (non-HARQ) region and a HARQ region, the non-HARQ region is used for transmitting non-HARQ data bursts, the HARQ region is used for transmitting non-HARQ data bursts, and the first sub-region includes the non-HARQ region or HARQ region.

The method may further comprise calculating a number of slots to be allocated in a second sub-region, and a total number of slots to be allocated in all sub-regions of the downlink frame in an accumulated manner every time the new PDU is allocated in the second sub-region according to the scheduling priority, wherein the second sub-region is the non-HARQ region or HARQ region.

According to further another aspect of the present invention, there is provided an apparatus for configuring a downlink frame in a communication system. The apparatus includes a frame configuring unit for determining a first transmission Protocol Data Unit/Packet Data Unit (PDU) to be transmitted according to a scheduling priority, variably determining an amount of a data burst by calculating a sub-channel axis size of a first sub-region and a number of slots to be allocated in the first sub-region in an accumulated manner when the first PDU is allocated in the first sub-region, determining a size of a MAP region according to an amount of the data burst, setting up the MAP region in a downlink frame region according to the determined size of the MAP region including allocation information of a data burst, and transmitting the data burst over a data burst allocation region set up in a remaining region except for the MAP region in the downlink frame region, wherein the data burst includes at least one PDU having the same Modulation and Coding Scheme (MCS) level, or is a data burst generated by concatenating PDUs of a same Mobile Station (MS), wherein the data burst allocation region includes a non-Hybrid Automatic Retransmit reQuest (non-HARQ) region and a HARQ region, the non-HARQ region is used for transmitting non-HARQ data bursts, the HARQ region is used for transmitting non-HARQ data bursts, and the first sub-region includes the non-HARQ region or HARQ region.

The frame configuring unit may further calculate a number of slots to be allocated in a second sub-region, and a total number of slots to be allocated in all sub-regions of the downlink frame in an accumulated manner every time the new PDU is allocated in the second sub-region according to the scheduling priority, wherein the second sub-region is the non-HARQ region or HARQ region.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for clarity and conciseness.

Figure 1:
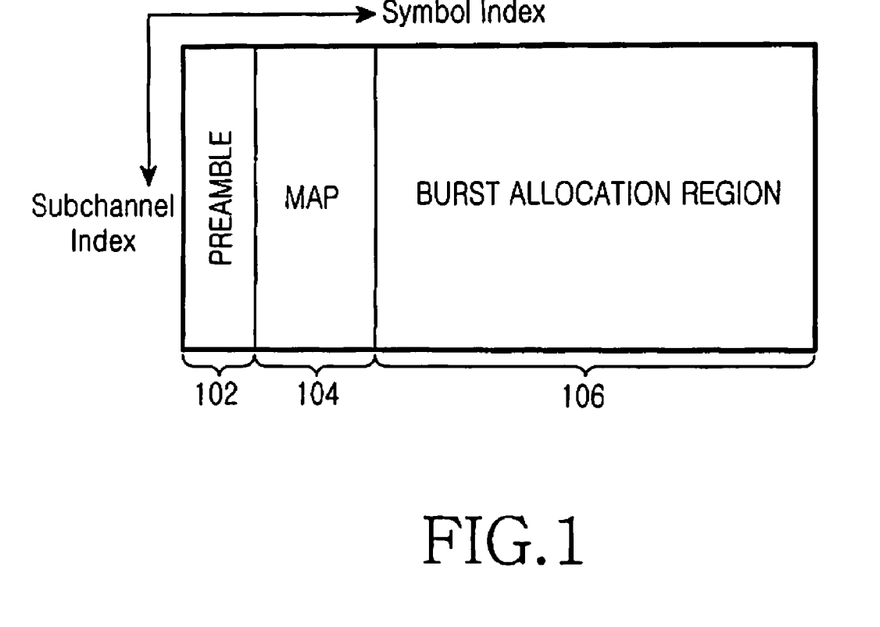
FIG. 1 is a diagram illustrating a DL frame structure in a communication system according to the present invention.

FIG. 1 illustrates a DL frame structure in a communication system according to the present invention.

In FIG. 1, the DL frame is divided into a preamble region 102, a MAP region 104, and a data burst allocation region 106.

A preamble for synchronization acquisition is located in the preamble region 102. The MAP region 104 includes position and allocation information of the data bursts transmitted over the data burst allocation region 106, and includes a DL-MAP and a UL-MAP, both having broadcast data information that Mobile Stations (MSs) receive in common. The MAP region 104 has a fixed size. An increase in the amount of data burst to be transmitted over the data burst allocation region 106 causes an increase in the amount of information transmitted over the MAP region 104. Therefore, when the amount of position and allocation information of the transmission data burst is greater than a size of the MAP region 104, the data burst should be transmitted over the data burst allocation region 106 of the next DL frame. However, if the amount of position and allocation information of the transmission data burst is less than the size of the MAP region 104, the MAP region 104 may have an available spare transmission space.

The data burst allocation region 106 is composed of slots, each of which is defined by the time domain (or horizontal axis) denoted by a symbol index, and the frequency domain (or vertical axis) denoted by a subchannel index. The DL data bursts transmitted to the MSs are transmitted over the data burst allocation region 106. In this case, the position and allocation information of the DL data bursts is transmitted over a DL-MAP of the MAP region 104.

The data burst allocation region 106 can employ Full Usage of Sub Channel (FUSC) and Partial Usage of Sub Channel (PUSC). Specifically, the data burst allocation region 106 may apply power boosting/deboosting to none of subchannels allocated thereto, or may apply power boosting/deboosting only to at least one of the subchannels.

Figure 2:
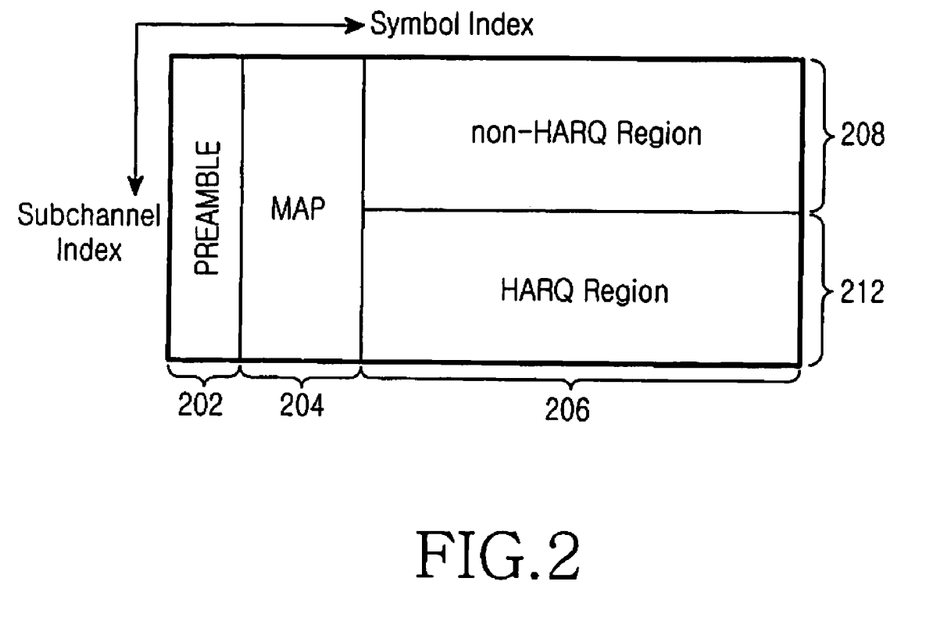
FIG. 2 is a diagram illustrating a DL frame structure for the case where non-HARQ bursts and HARQ bursts coexist in a communication system according to the present invention.

FIG. 2 illustrates a downlink frame structure for the case where non-Hybrid Automatic Retransmit reQuest (non-HARQ) bursts and HARQ bursts coexist in a communication system according to the present invention.

Referring to FIG. 2, a DL frame is divided into a preamble region 202, a MAO region 204, and a data burst allocation region 206. The regions constituting the DL frame are similar to those in FIG. 1.

The data burst allocation region 206 is fragmented into a non-HARQ region 208 used for transmitting non-HARQ data bursts and an HARQ region 212 used for transmitting HARQ data bursts. The data burst allocation region 206 can be fragmented into at least one sub-data burst regions. For example, the data burst allocation region 206 can be composed of one sub-data burst region which is one of the non-HARQ region and the HARQ region, or can be fragmented into two sub-data burst regions of the non-HARQ region and the HARQ region.

The present invention determines the number of subchannels, indicating the optimal performance effect, when the fragmented sub-data burst regions employ FUSC and PUSC.

Figure 3:
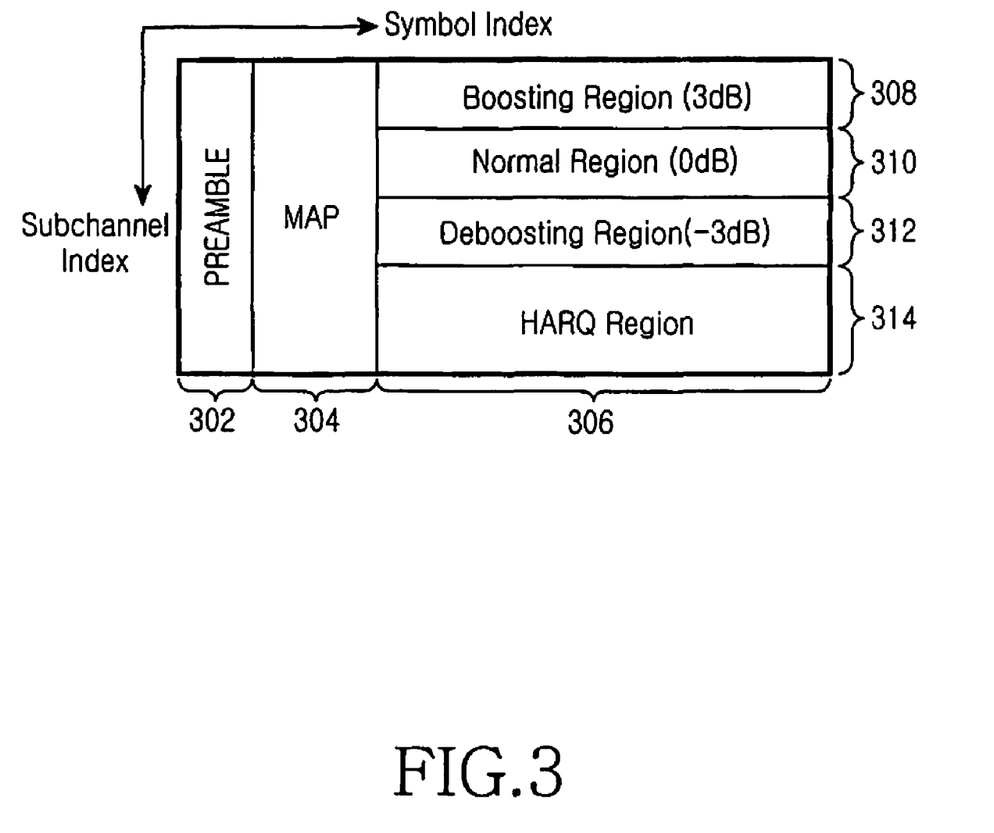
FIG. 3 is a diagram illustrating a DL frame structure where power boosting/deboosting is taken into account for the case in which non-HARQ bursts and HARQ bursts coexist in a communication system according to the present invention.

FIG. 3 illustrates a DL frame structure where power boosting/deboosting is taken into account for the case in which non-HARQ bursts and HARQ bursts coexist in a communication system according to the present invention.

In FIG. 3, the DL frame is divided into a preamble region 302, a MAP region 304, and a data burst allocation region 306. The regions constituting the DL frame are similar to those in FIG. 1.

The data burst allocation region 306 is fragmented into non-HARQ regions 308 to 312, and an HARQ region 314. The non-HARQ regions 308 to 312 are re-fragmented into sub-data burst allocation regions to which power boosting/deboosting is applied.

For example, the data burst allocation region 306 is divided into four sub-data burst regions, i.e., a boosting region 308, a normal region 310, a deboosting region 312, and an HARQ region 314. The data bursts allocated in the boosting region 308 undergo 3 dB (decibel) power boosting; the data bursts allocated in the normal region 310 undergo 0 dB power boosting; and the data bursts allocated in the deboosting region 312 undergo −3 dB power boosting.

Similarly, the data burst allocation region 306 can be fragmented into at least one sub-data burst regions. That is, while the prior art performs power boosting/deboosting on each of the data bursts, the present invention previously divides the region over which the data bursts are transmitted, and performs separate power boosting or power deboosting on the divided regions independently.

A method in which the present invention determines the number of subchannels, indicating the optimal performance effect, when the fragmented regions employ FUSC and PUSC, will now be described.

Figure 4:
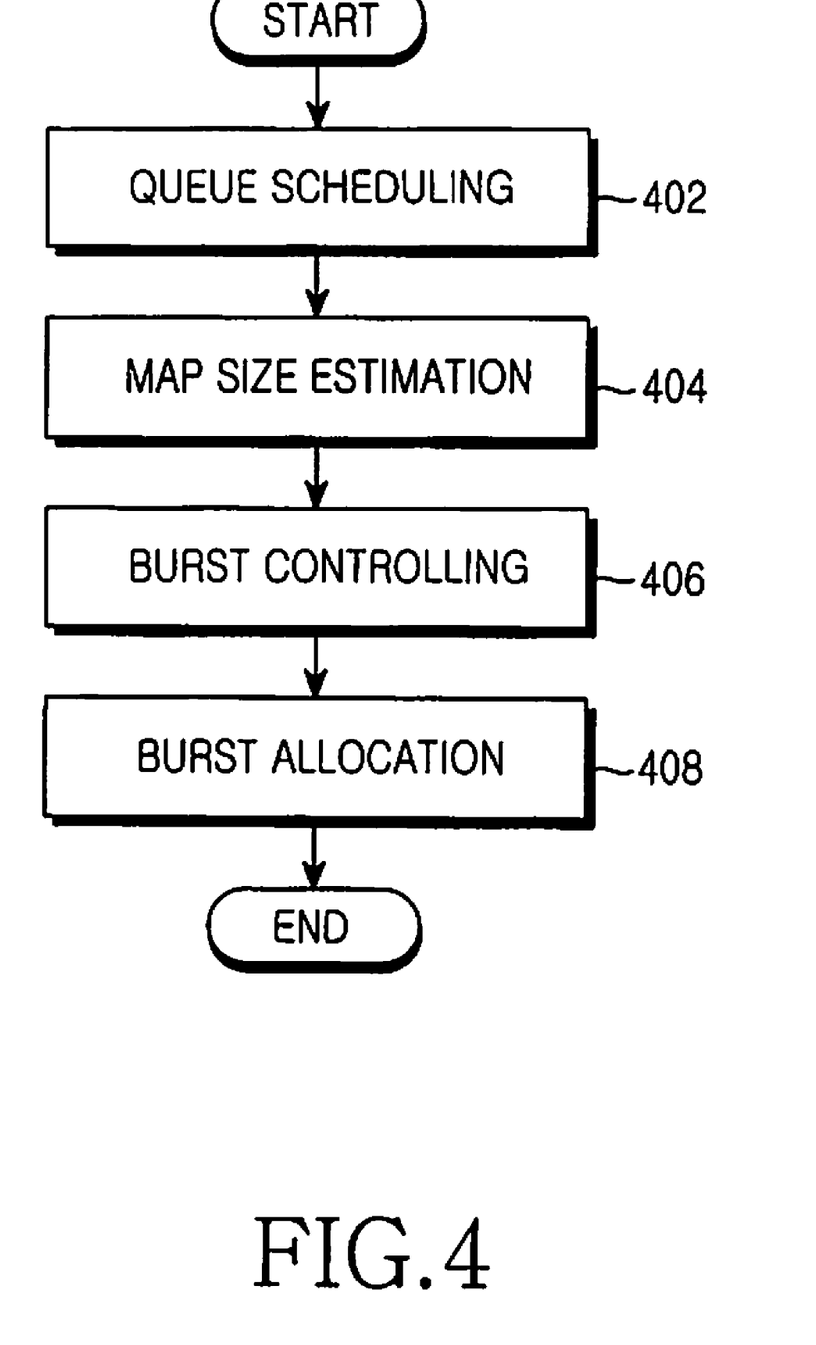
FIG. 4 is a diagram illustrating a resource allocation procedure according to the present invention.

FIG. 4 illustrates a resource allocation procedure according to an embodiment of the present invention. A DL frame has a plurality of slots, each of which is defined by the frequency domain and the time domain (or symbol axis). When the data bursts are allocated in the data burst allocation region in units of slots, consideration should be given so that there is no slot wasted in the DL frame.

In step 402, a Base Station (BS) performs queue scheduling for determining scheduling priority associated with the corresponding connection, on the data bursts to be transmitted to an MS, separately for each service class.

In step 404, the BS estimates the MAP overhead necessary for the transmission data bursts to estimate a MAP size, and then proceeds to step 406. An increase in the number of the transmission data bursts causes an increase in the MAP size. In this case, the increase in the MAP size reduces a size of a data burst allocation region. Therefore, the MAP size and the data burst allocation region size should be appropriately estimated on a trade-off basis. The MAP size estimation will be described below with reference to FIGS. 5A to 5C and FIGS. 6A to 6C.

In step 406, the BS performs data burst concatenation for concatenating the data bursts being transmitted to the same MS or the data bursts having the same Modulation and Coding Scheme (MCS) level into one data burst, to minimize the MAP overhead, and then proceeds to step 408. The MCSs, combinations of modulation schemes and coding schemes, can be defined as multiple MCSs with level 1 to level N.

In step 408, the BS allocates the data bursts, being input according to scheduling priority, in a data burst allocation region of a DL frame according to a particular rule.

Figure 5A:
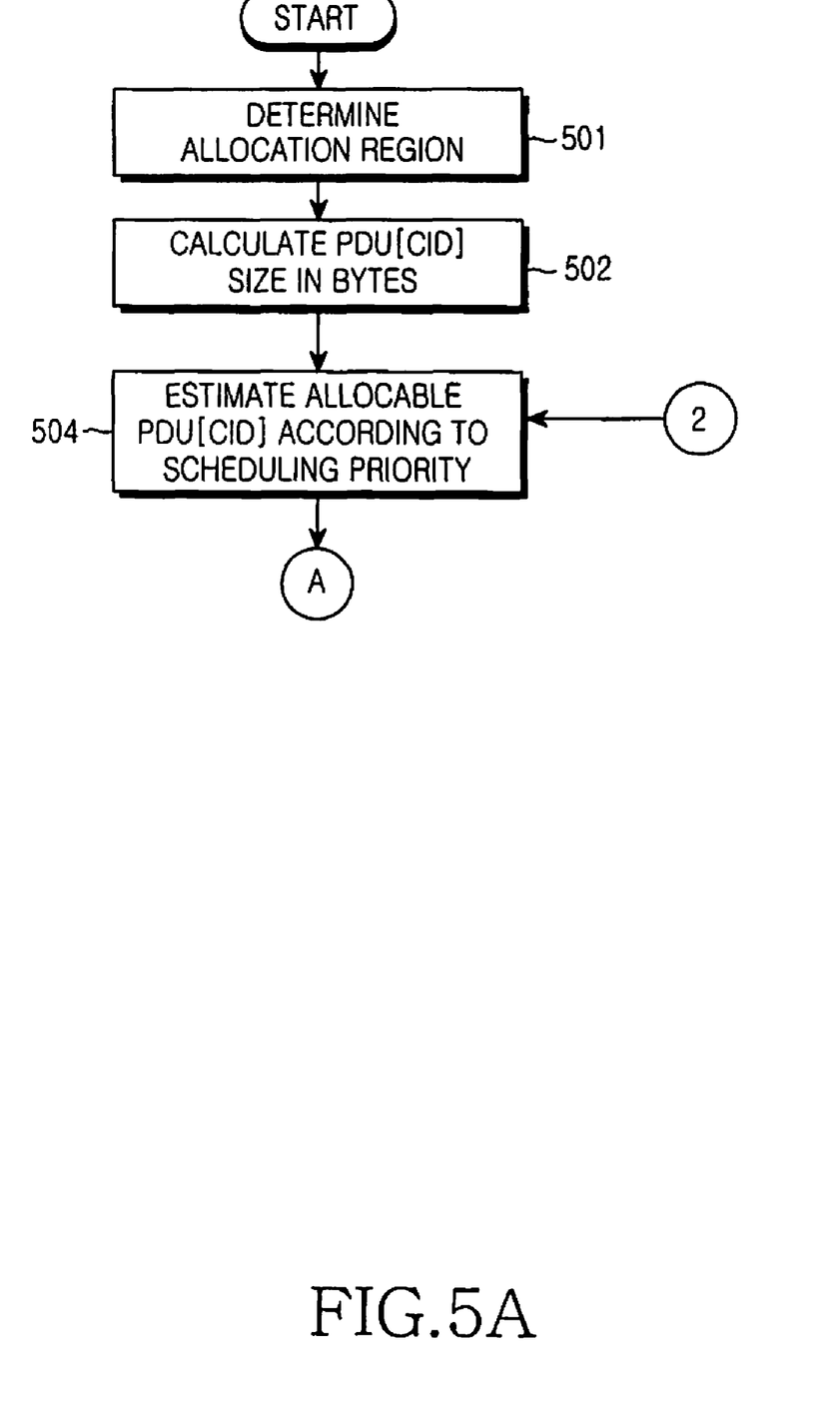
FIGS. 5A to 5C are diagrams illustrating a process of estimating a MAP size when non-HARQ bursts and HARQ bursts coexist in a communication system according to a first embodiment of the present invention.
Figure 5B:
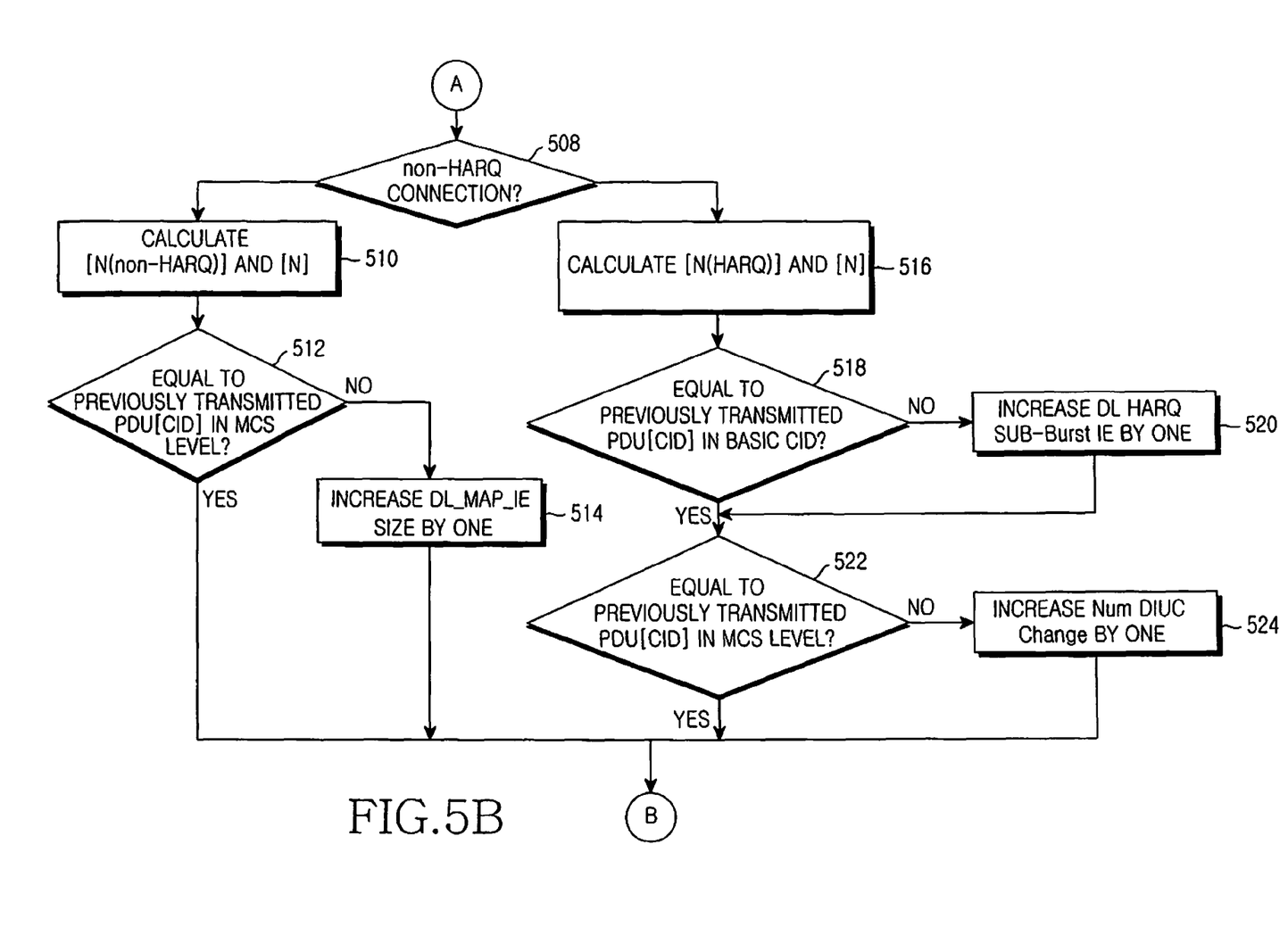
Figure 5C:
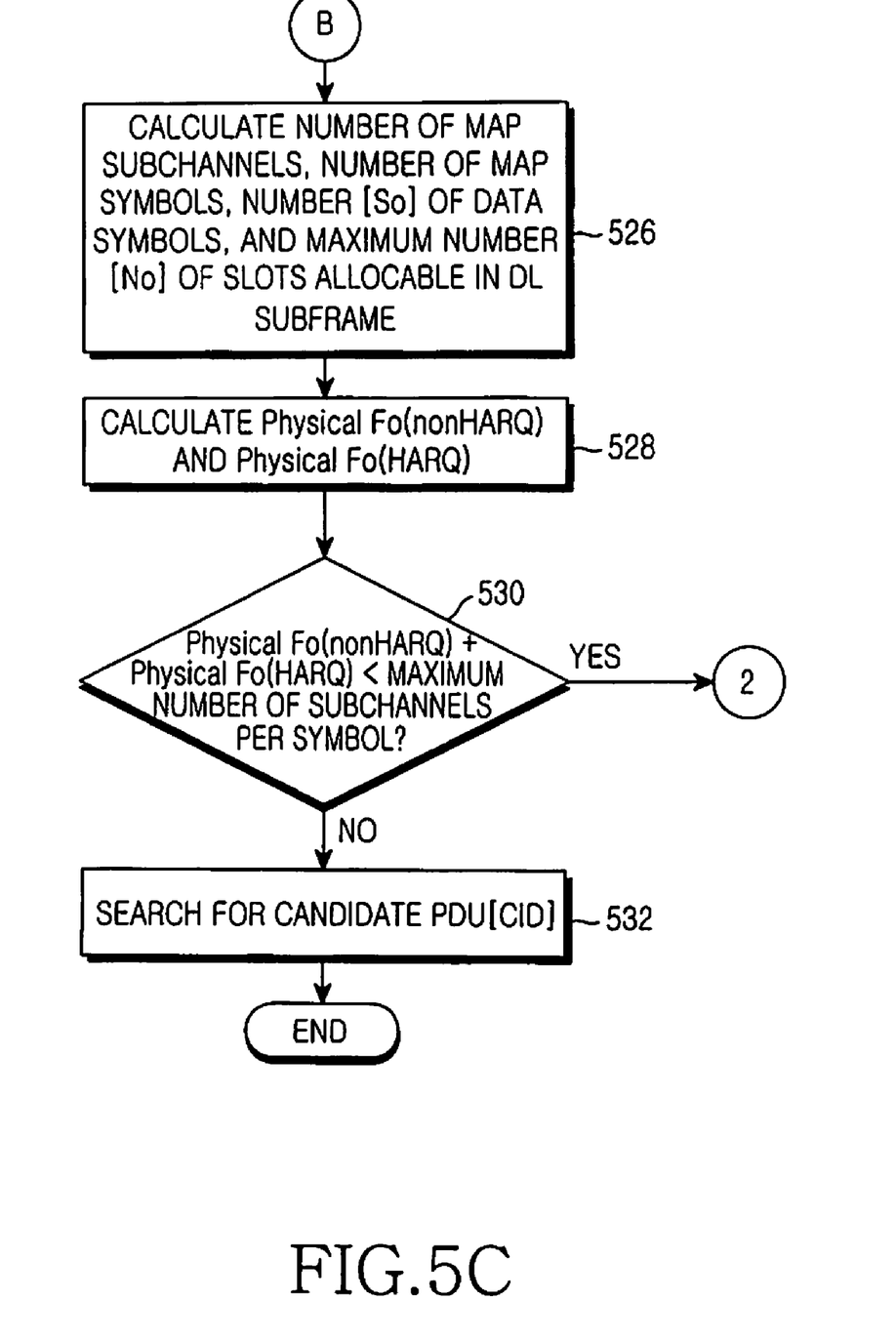

FIGS. 5A to 5C illustrate a first example of a process of estimating a MAP size when non-HARQ bursts and HARQ bursts coexist in a communication system according to the present invention.

In step 501, a BS determines a sub-data burst region over which the BS will transmit a Protocol Data Unit or Packet Data Unit [Connector Identifier] (PDU[CID]) in the current DL frame, and then proceeds to step 502. The sub-data burst region includes an HARQ region and a non-HARQ region.

In step 502, the BS calculates, in bytes, a size of the PDU [CID], and then proceeds to step 504.

In step 504, the BS estimates a transmission PDU[CID] according to scheduling priority.

Referring to FIG. 5B, in step 508, the BS determines whether the PDU[CID] estimated as a currently transmittable PDU[CID], referred to herein as a current PDU[CID], is a connection of the non-HARQ region, referred to herein as a non-HARQ connection, or a connection of the HARQ region, referred to herein as an HARQ connection. If the estimated PDU[CID] is determined to be a non-HARQ connection, the BS proceeds to step 510, and if the estimated PDU[CID] is an HARQ connection, the BS proceeds to step 516.

In step 510, the BS calculates the total number [N(non-HARQ)] of slots to be allocated in the non-HARQ region of the current DL frame, and the total number [N] of slots to be allocated in all sub-data burst regions constituting the data burst allocation region. That is, the BS calculates [N(non-HARQ)] and [N] in an accumulated manner every time the BS estimates the transmission PDU[CID] according to the scheduling priority, and then proceeds to step 512. When [N] exceeds the maximum number [No] of slots allocable in the current DL frame, the BS may include the PDU[CID] that should undergo fragmentation.

In step 512, to minimize the MAP overhead, the BS determines whether an MCS level of the current PDU[CID] is equal in an MCS level of the previously transmitted PDU [CID]. If they are determined to be equal, the BS proceeds to step 526 in FIG. 5C. However, if they are determined to be different in the MCS level, the BS increases, in step 514, a Downlink MAP Information Element (DL_MAP_IE) size for allocation information of the current PDU[CID] by one, and then proceeds to step 526. That is, when the current PDU [CID] is equal in the MCS level to the previously transmitted PDU[CID], the BS does not increase the DL_MAP_IE size as they are tied up into one data burst. However, when the estimated PDU[CID] is different in the MCS level from the previously transmitted PDU[CID], the BS increases the DL_MAP_IE size.

In step 516, the BS calculates the total number [N(HARQ)] of slots to be allocated in the HARQ region of the current DL subframe, and the total number [N] of slots to be allocated in all sub-data burst regions constituting the data burst allocation region. That is, the BS calculates [N(HARQ)] and [N] in an accumulated manner every time the BS estimates the allocable PDU[CID] according to the scheduling priority, and then proceeds to step 518. [N] can include the PDU[CID] that should undergo fragmentation, when [N] exceeds the maximum number [No] of slots allocable in the current DL frame.

In step 518, if the transmission PDU[CID] is estimated as a currently transmittable PDU[CID], referred to herein as a current PDU[CID], the BS determines whether the current PDU[CID] is equal to the previously transmitted PDU[CID] in Basic CID, i.e., whether the estimated PDU[CID] is a PDU[CID] for the same MS. If they are determined to be different in the Basic CID, the BS increases, in step 520, a DL HARQ Sub-burst_IE size for allocation information of the estimated PDU[CID] by one, and then proceeds to step 522. However, if they are determined to be equal in the Basic CID, the BS proceeds to step 522. That is, when the current PDU [CID] is equal to the previously transmitted PDU[CID] in Basic CID of the MS, the BS does not increase the DL HARQ Sub-burst_IE size as they are tied up into one data burst. However, when the current PDU[CID] is different from the previously transmitted PDU[CID] in Basic CID of the MS, the BS increases the DL HARQ Sub-burst_IE size.

In step 522, the BS determines whether the PDU[CID] estimated to minimize the MAP overhead is equal to the previously transmitted PDU[CID] in the MCS level. If they are determined to be equal in the MCS level, the BS proceeds to step 526 in FIG. 5C, and if they are different in the MCS level, the BS proceeds to step 524 where the BS increases a Num Downlink Interval Usage Code (DIUC) Change size by one for new DIUC allocation information.

In step 526, the BS calculates the number of MAP subchannels, the number of MAP symbols, the number [So] of data symbols, and the maximum number [No] of slots allocable in the corresponding DL subframe, and then proceeds to step 528. The DL_MAP_IE value is a variable for determining the number of MAP subchannels, the number of MAP symbols, and the number [So] of data symbols. Therefore, unless the DL_MAP_IE value increases, the number of MAP slots, the number of MAP symbols, and the [So] remain unchanged. The parameters used in step 526 are calculated by Equation (1) shown below.

Equations (1A) and (1B) are equation examples by which the MAP size can be estimated based on PUSC, and may be replaceable with other ones.

$$\text{Number of } DL \text{ MAP Bits} = \text{Required Info\_}DL\text{\_Common} + \text{RequiredInfo\_NonHarq} + \text{RequiredInfo\_Harq} \quad (1A)$$

RequiredInfo_DL_Common=88+36*UL_N_I_LEVEL_IE+44*STC_DL_ZONE_IE, where UL_N_I_LEVEL_IE (UL Noise and Interference Level Information Element) indicates a UL interference and noise level that the BS broadcasts to the MSs belonging to coverage of the BS, for open-loop power control, and STC_DL_ZONE_IE (Space Time Coding_DownLink_Information Element) indicates a specific permutation or a specific transmit diversity mode, and the BS transmits RequiredInfo_DL_Common in the DL-MAP.

RequiredInfo_NonHarq=36*dl_map_ie_cnt+CID_SWITCH_IE* (8*dl_map_ie_cnt+16*cids_in_dl_map_cnt), where dl_map_ie_cnt indicates the number of DL MAPs, and cids_in dl_map cnt indicates the number of CIDs to be included in DL MAPs.

RequiredInfo_Harq=76+32*dl_Harq_sub_burst_ie_cnt+ 8*diuc_change_cnt+16*NUM_CQI_ALLOC_CHANGE+ 4*NUM_DEALLOC_CQICH, where dl_Harq_sub_burst_ ie_cnt indicates the number of data regions, i.e., sub-bursts, in which the bursts corresponding to each of HARQ modes constituting HARQ DL MAP IE are allocated, diuc_ change_cnt is included in dl_Harq_sub_burst_ie and indicates that when there is a change in DIUC during burst allocation, 8 bits are added, NUM_CQI_ALLOC_CHANGE indicates the number of channel Quality Information (CQI) feedbacks that the MS transmits over CQI channels indexed with CQI indexes during a particular frame, and NUM_ DEALLOC_CQICH indicates the number of CQI feedbacks which are released when the CQI feedbacks transmitted over the CQI channels are successfully received.

Number of UL MAP Bits=RequiredInfo_UL_Common+RequiredInfo_UL_NonHarq+RequiredInfo_UL_Harq  (1B)

RequiredInfo_UL_Common=48+212*UL_CONTROL_CH_IE+60*CDMA_ALLOC_IE, where UL_CONTROL_CH_IE (UL Control Channel IE) indicates Initial Ranging, Periodic & Bandwidth (BW) Ranging, and Fast-Feedback Channels and ACK Channels information, and CDMA_ALLOC_IE (CDMA Allocation UL-MAP IE) indicates a UL-MAP IE used for allocating a bandwidth to the user that has requested the bandwidth using a CDMA request code.

RequiredInfo_UL_NonHarq=32*UL_MAP_IE_cnt

RequiredInfo_UL_Harq=44+36*UL_HARQ_SUB_ BURST_IE_cnt, where UL_HARQSUB_BURST_IE_cnt is included in the HARQ UL-MAP IE, and indicates the number of data regions, i.e., sub-bursts, in which the bursts corresponding to each of HARQ modes constituting the HARQ UL MAP IE are allocated. The UL_MAP_IE_Cnt indicates the number of UL_MAP_IEs to be transmitted over the UL frame.

Number of MAP Bits=Number of DL MAP Bits+ Number of UL MAP Bits+32 (CRC)

Number of Map Subchannels=ceil(Number of MAP Bits/48)*6+4 (FCH)

As used herein, ceil(x) refers to a mathematical function for making an integer value by rounding up a decimal point of x.

Number of Map Symbols=ceil(Number of Map Subchannels/30 (Maximum Number of Subchannels per Symbol))*2

Number [So] of Data Symbols=27−(1 (Preamble)+ Number of Map Symbols)

Maximum Number [No] of Slots Allocable in DL Subframe=30 (Maximum Number of Subchannels per Symbol)*So/2 dl_map_ie_cnt denotes the number of DL_MAP_IEs to be transmitted over the DL subframe, and cids_in_dl_map_cnt denotes the number of CIDs to be transmitted over the DL_MAP_IE. Further, UL_MAP_IE_cnt denotes the number of DL_MAP_IEs to be transmitted over the UL subframe.

The number of DL_MAP_IEs and the number of UL_MAP_IEs are determined depending on allocation information of desired transmission DL-MAP data bursts and allocation information of desired transmission UL-MAP data bursts. Further, the number of symbols of a MAP region and the number of symbols of data burst regions for transmission of data bursts are determined using Equations (1A) and (1B).

For example, in the frame having the PUSC structure, the number of slots per 2 symbols is 30, and in the frame having the FUSC structure, the number of slots per symbol is 16. After calculating the number of MAP symbols and the number of data burst symbols, the BS can allocate data bursts in the sub-data burst allocation region. STC, as used herein, refers to Space Time Coding, and is used to acquire transmit diversity gain in the downlink.

Generally, in the DL frame, the preamble region is composed of one symbol, and in one frame region, the number of UL_MAP_IEs and DL_MAP_IEs is determined depending on the number of UL data bursts and DL data bursts that should be transmitted in the corresponding frame region. However, as the present invention performs or does not perform concatenation on the data bursts, the number of DL_MAP_IEs is subject to change.

In step 528, the BS calculates a sum of subchannel-axis sizes Physical Fo[region] of all sub-data burst regions of the current DL frame, and then proceeds to step 530. Because the Physical Fo[region] means the total size of the vertical size corresponding to the frequency domain in FIG. 3, the BS calculates the sum of a subchannel-axis size Physical Fo[non-HARQ] of a non-HARQ region and a subchannel-axis size Physical Fo[HARQ] of a HARQ region of the current DL frame. The Physical Fo[region] is defined as Equation (2).

Physical Fo[region]=ceil(N[region]/Number of Data Symbols)  (2)

In step 530, the BS compares the sum of the Physical Fo[non-HARQ] of the non-HARQ region and the Physical Fo[HARQ] of the HARQ region with the maximum number of subchannels per symbol. If the sum of the Physical Fo[non-HARQ] and the Physical Fo[HARQ] is less than the maximum number of subchannels per symbol as a result of the comparison, the BS proceeds to step 504 where the BS estimates a transmission PDU[CID] following the current PDU [CID] according to the scheduling priority. However, if the sum of the Physical Fo[non-HARQ] and the Physical Fo[HARQ] is greater than or equal to the maximum number of subchannels per symbol, the BS proceeds to step 532, completing the process of estimating a transmission PDU [CID] according to the scheduling priority. Alternatively, the BS can compare the sum of the Physical Fo[non-HARQ] of the non-HARQ region and the Physical Fo[HARQ] of the HARQ region with the total number of slots to be allocated in all sub-data burst regions of the DL frame, calculated in step 514 or 520, instead of the maximum number of subchannels per symbol.

In step 532, the BS searches for a candidate PDU[CID], and then ends the MAP size estimation. The candidate PDU [CID] is defined as a PDU[CID] with the highest MCS level among the PDUs left in the memory queue except for the transmission PDU[CID]s estimated in the step 503. Thereafter, the BS uses the candidate PDU[CID] when the BS fills the remaining slot after transmitting the transmission PDU [CID]s estimated in the step 503 over the data burst allocation region.

Figure 6A:
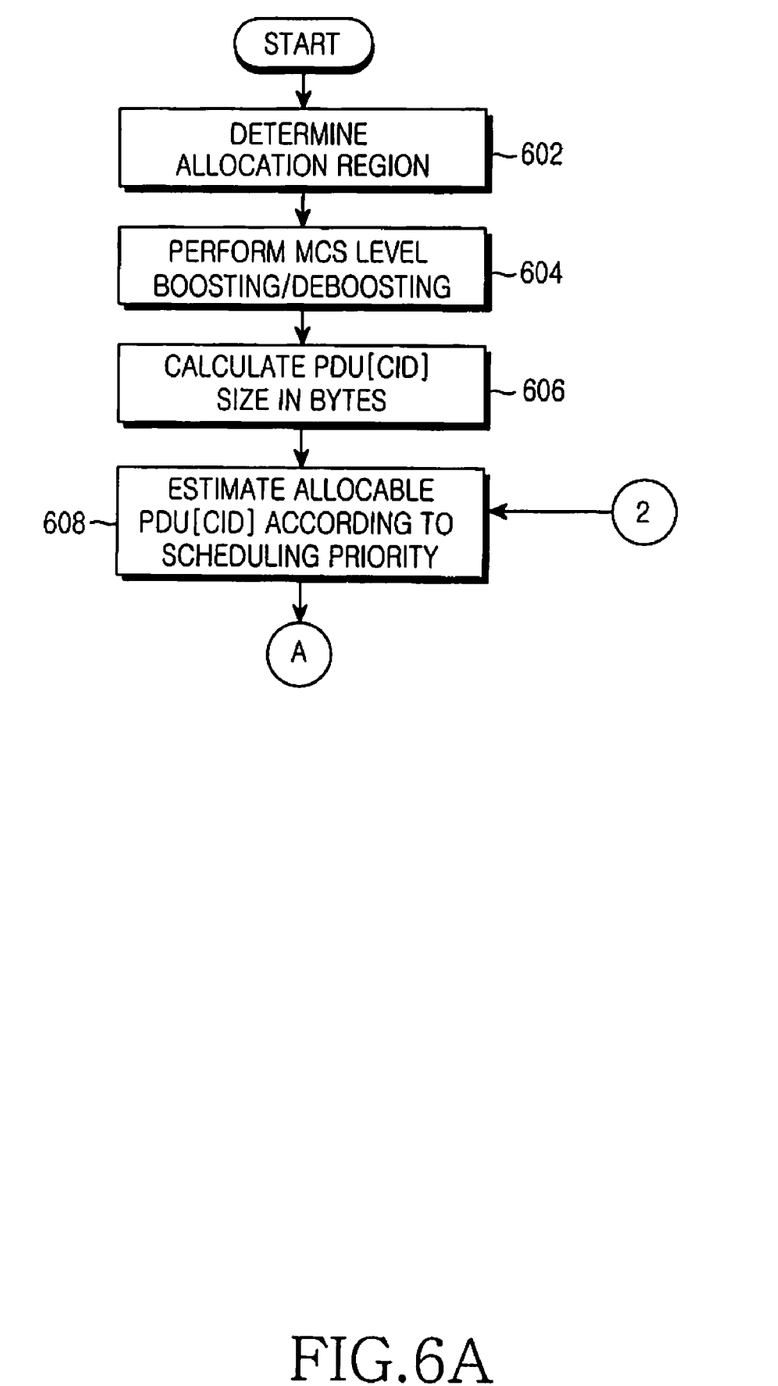
FIGS. 6A to 6C are diagrams illustrating a MAP size estimation process performed when non-HARQ bursts and HARQ bursts coexist according to a second embodiment of the present invention.
Figure 6B:
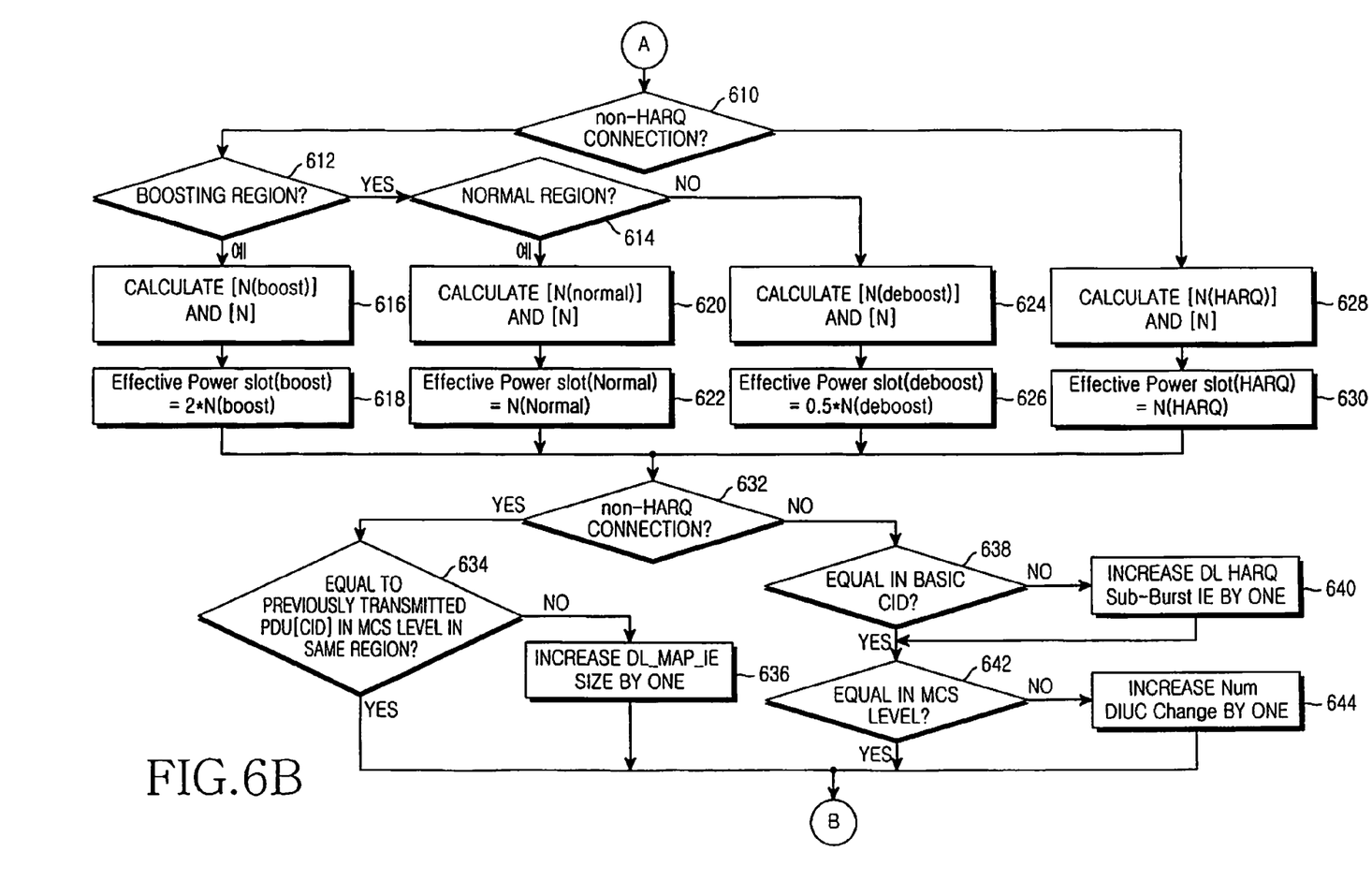
Figure 6C:
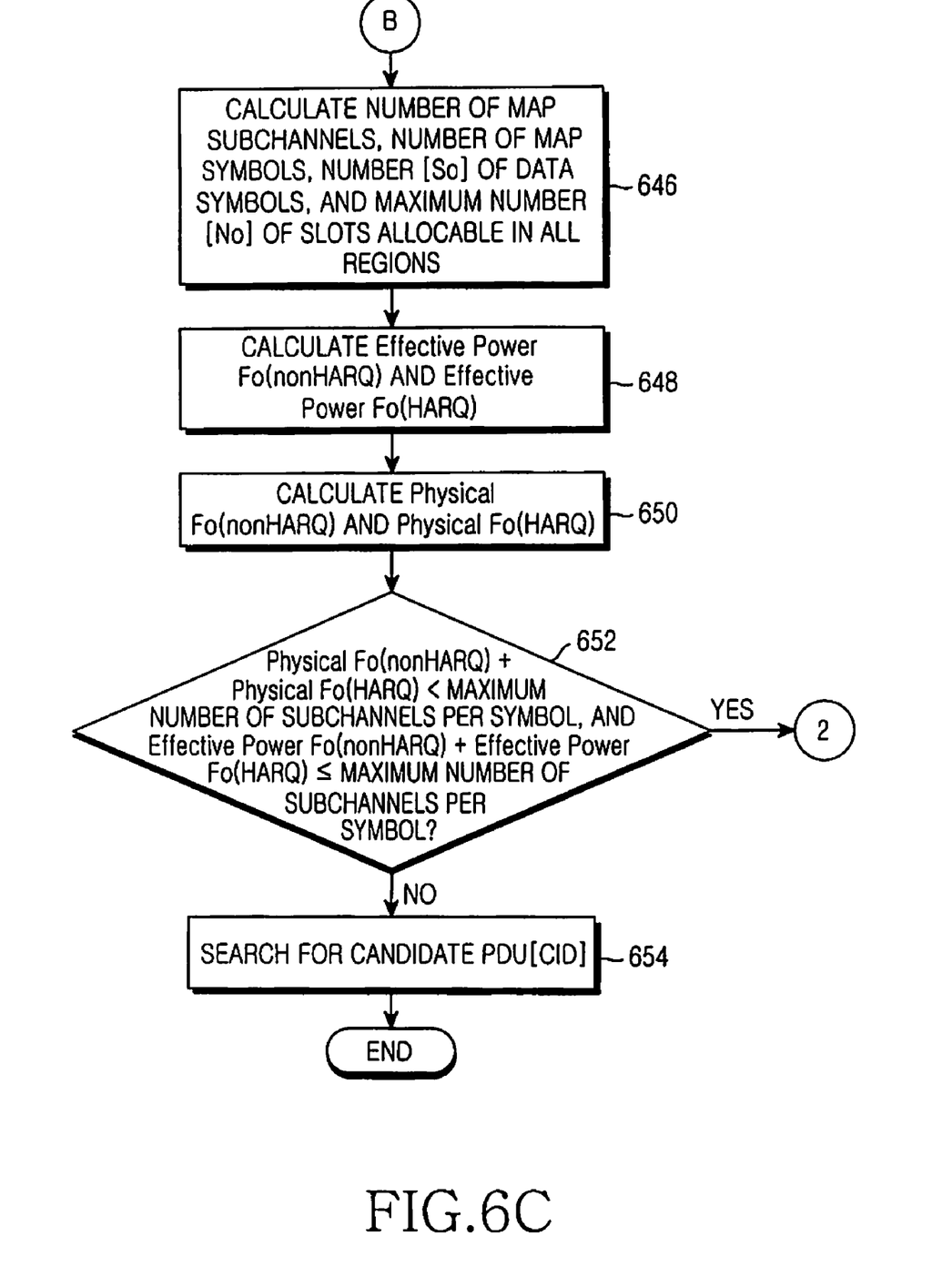

FIGS. 6A to 6C illustrate a second MAP size estimation process example performed when non-HARQ bursts and HARQ bursts coexist according to the present invention. Power boosting and deboosting are taken into consideration during the MAP size estimation.

In FIG. 6A, in step 602, the BS determines a sub-data burst region over which the BS will transmit PCU[CID] in current DL frame, and then proceeds to step 604. The sub-data burst region includes a HARQ region and a non-HARQ region. The non-HARQ region is divided into a boosting region, a normal region and a deboosting region, to which the power boosting or power deboosting will be applied. A description will now be made of a method for dividing the non-HARQ region into regions to which power boosting or power deboosting will be applied.

When a received Carrier-to-Interference plus Noise Ratio (CINR) value of an MS to which the BS will transmit a PDU[CID] is less than a threshold value Region Threshold_1 of the boosting region and the normal region, the BS allows the corresponding PDU[CID] to belong to the boosting region. When the received CINR value of the MS to which the BS will transmit a PDU[CID] is greater than or equal to the Region Threshold_1 and less than a threshold value Region Threshold_2 of the normal region and the deboosting region, the BS allows the corresponding PDU[CID] to belong to the normal region. When the received CINR value of the MS to which the BS will transmit a PDU[CID] is greater than or equal to the Region Threshold_2, the BS allows the corresponding PDU[CID] to belong to the deboosting region.

In step 604, the BS performs MCS level boosting/deboosting, and then proceeds to step 606. MCS level boosting/deboosting, as used herein, refers to an operation of increasing an MCS level of a PDU[CID] belonging to the boosting region by one level, and decreasing an MCS level of a PDU[CID] belonging to the deboosting region by one level. In step 606, the BS calculates PDU[CID] sin bytes, and then proceeds to step 608 where the BS searches for a transmission PDU[CID] with the Min Scheduling Priority, and then proceeds to step 610(A) in FIG. 6B.

In step 610(A), the BS determines whether the PDU[CID] estimated as a currently transmittable PDU[CID], referred to herein as a current PDU[CID], is a connection of a the non-HARQ region, referred to herein as a non-HARQ connection, or a connection of the HARQ region, referred to herein as an HARQ connection. If the current PDU[CID] is determined to be the non-HARQ connection, the BS proceeds to step 612, and if the estimated PDU[CID] is the HARQ connection, the BS proceeds to step 628.

In step 612, the BS determines whether the current PDU[CID] is a PDU[CID] belonging to the boosting region. If the current PDU[CID] is determined to be a PDU[CID] belonging to the boosting region, the BS proceeds to step 616, and if the estimated PDU[CID] is not a PDU[CID] belonging to the boosting region, the BS proceeds to step 614. The BS determines in step 614 whether the current PDU[CID] is a PDU[CID] belonging to the normal region. If the current PDU[CID] is determined to be a PDU[CID] belonging to the normal region, the BS proceeds to step 620, and if the current PDU[CID] is not a PDU[CID] belonging to the normal region, the BS proceeds to step 624.

In step 616, the BS calculates the total number [N(boost)] of slots of the boosting region and the total number [N] of slots to be allocated in all sub-data burst regions in the current DL frame. That is, the BS calculates the [N(boost)] by accumulating the number of slots to be allocated in the boosting region every time the BS estimates a transmission PDU[CID] according to the scheduling priority, and then proceeds to step 618. When the [N(boost)] exceeds the maximum number [No(boost)] of slots allocable in the boosting region of the current DL frame, the BS may include the PDU[CID] that should undergo fragmentation. In step 618, the BS calculates a power slot Effective Power Slot(boost), and then proceeds to step 632. The Effective Power Slot(boost) is the total number of slots where the data bursts power-boosted in the boosting region will be allocated, and is calculated using Equation (3).

$$\text{Effective Power Slot(boost)} = 2 * N(\text{boost}) \quad (3)$$

In step 620, the BS calculates the total number [N(normal)] of slots in the normal region and the total number [N] of slots to be allocated in all sub-data burst regions of the current DL frame. That is, the BS calculates the [N(normal)] by accumulating the number of slots to be allocated in the normal region every time the BS estimates an allocable PDU[CID] according to the scheduling priority, and then proceeds to step 622. When the [N(normal)] exceeds the maximum number [No(normal)] of slots allocable in the normal region of the current DL frame, the BS may include the PDU[CID] that will undergo fragmentation. In step 622, the BS calculates a power slot Effective Power Slot(normal) for the normal region, and then proceeds to step 628. The Effective Power Slot(normal) is the total number of slots where the data bursts power-maintained in the normal region will be allocated, and is calculated using Equation (4).

$$\text{Effective Power Slot(normal)} = 1 * N(\text{normal}) \quad (4)$$

In step 624, the BS calculates the total number [N(deboost)] of slots of the deboosting region and the total number [N] of slots to be allocated in all sub-data burst regions of the current DL frame. That is, the BS calculates the [N(deboost)] by accumulating the number of slots to be allocated in the deboosting region every time the BS estimates a transmission PDU[CID] according to the scheduling priority, and then proceeds to step 626. When the [N(deboost)] exceeds the maximum number [No(deboost)] of slots allocable in the deboosting region of the current DL frame, the BS may include the PDU[CID] that will undergo fragmentation. In step 626, the BS calculates a power slot Effective Power Slot(deboost) for the deboosting region, and then proceeds to step 638. The Effective Power Slot(deboost) is the total number of slots where the data bursts power-deboosted in the deboosting region will be allocated, and is calculated using Equation (5).

$$\text{Effective Power Slot(deboost)} = 0.5 * N(\text{deboost}) \quad (5)$$

In step 628, the BS calculates the total number [N(HARQ)] of slots of the HARQ region and the total number [N] of slots to be allocated in all sub-data burst regions of the current DL frame. That is, the BS calculates the [N(HARQ)] by accumulating the number of slots to be allocated in the HARQ region every time the BS estimates a transmission PDU[CID] according to the scheduling priority, and then proceeds to step 630. When the [N(HARQ)] exceeds the maximum number [No(HARQ)] of slots allocable in the HARQ region of the current DL frame, the BS may include the PDU[CID] that will undergo fragmentation. In step 636, the BS calculates a power slot Effective Power Slot(HARQ) for the HARQ region, and then proceeds to step 638. The Effective Power Slot(HARQ) is the total number of slots where the data bursts power-maintained in the HARQ region will be allocated, and is calculated using Equation (6).

$$\text{Effective Power Slot(HARQ)} = 1 * N(\text{HARQ}) \quad (6)$$

In step 632, the BS determines whether the current PDU[CID] is a connection of the non-HARQ region or a connection of the HARQ region. If the current PDU[CID] is determined to be a connection of the non-HARQ region, the BS proceeds to step 634, and if the estimated PDU[CID] is a connection of the HARQ region, the BS proceeds to step 638.

In step 634, the BS determines whether the current PDU[CID] estimated to minimize the MAP overhead belongs to the same sub-data burst region as the previously transmitted PDU[CID] and is equal in the MCS level to the previously transmitted PDU[CID]. If the current PDU[CID] is determined to not belong to the same sub-data burst region as the previously transmitted PDU[CID] or is different in the MCS level to the previously transmitted PDU[CID], the BS proceeds to step 636. However, if the estimated PDU[CID] is determined to belong to the same sub-data burst region as the previously transmitted PDU[CID] and is equal in the MCS level to the previously transmitted PDU[CID], the BS proceeds to step 646(B). In step 636, the BS increases a DL_MAP_IE size for allocation information of the estimated PDU[CID] by one, and then proceeds to step 646(B). That is, when the current PDU[CID] belongs to the same sub-data burst region as the previously transmitted PDU[CID] and is equal in the MCS level to the previously transmitted PDU[CID], the BS does not increase the DL_MAP_IE size as they are tied up into one data burst. However, when the current PDU[CID] is different from the previously transmitted PDU[CID] in terms of the MCS level or the sub-data burst region to which they belong, the BS increases the DL_MAP_IE size.

In step 638, the BS determines whether the current PDU[CID] estimated to minimize the MAP overhead is equal in Basic CID to the previously transmitted PDU[CID], i.e., whether the current PDU[CID] is a PDU[CID] for the same MS. If they are determined to be equal in the Basic CID, the BS proceeds to step 642, and if they are different in the Basic CID, the BS proceeds to step 640 where the BS increases a DL HARQ Sub-burst_IE size for allocation information of the current PDU[CID] by one, and then proceeds to step 642.

In step 642, the BS determines whether the current PDU[CID] estimated to minimize the MAP overhead is equal in MCS level to the previously transmitted PDU[CID]. If they are determined to be equal in the MCS level, the BS proceeds to step 646(B), and if they are different in the MCS level, the BS proceeds to step 644 where the BS increases a Num DIUC Change size for new DIUC allocation information by one.

Referring to FIG. 6C, in step 646(B), the BS calculates the number of MAP subchannels, the number of MAP symbols, the number [So] of data symbols, and the maximum number [No] of slots allocable in all sub-data burst regions constituting the data burst allocation region of the current DL frame, and then proceeds to step 648. The DL_MAP_IE value is a variable for determining the number of MAP subchannels, the number of MAP symbols, and the number [So] of data symbols. Therefore, unless the DL_MAP_IE value increases, the number of MAP slots, the number of MAP symbols, and the [So] remain unchanged. Similarly, the above parameters used during the MAP size estimation are calculated by Equation (1).

Equation (7) is an equation example by which the MAP size estimation is performed based on PUSC. The parameters used herein can be equal in values to those defined in Equation (1), and are subject to change.

In step 648, the BS calculates the maximum value Effective Power Fo(region) of power-considered subchannel-axis size for each corresponding sub-data burst region of the current DL frame, and then proceeds to step 650. The Effective Power Fo(region) is calculated using Equation (7).

$$\text{Effective Power } Fo(\text{region}) = \text{ceil}(\text{Effective Power Slot (region)/Number of Data Symbols}) \quad (7)$$

In step 650, the BS calculates a subchannel-axis size for each individual sub-data burst region in the current DL frame using Equation (2), and then proceeds to step 658. That is, the BS calculates a subchannel-axis size Physical Fo[non-HARQ] of the non-HARQ region and a subchannel-axis size Physical Fo[HARQ] of the HARQ region of the current DL frame, and then proceeds to step 652.

In step 652, the BS determines whether Physical Fo[non-HARQ]+Physical Fo[HARQ] is less than the maximum number of subchannels per symbol, and the Effective Power Fo[non-HARQ]+the Effective Power Fo[HARQ] is less than or equal to the maximum number of subchannels per symbol. The Physical Fo[non-HARQ] is calculated as Physical Fo[Boost]+Physical Fo[Normal]+Physical Fo[Deboost], and the Effective Power Fo[non-HARQ] is calculated as Effective Power Fo[Boost]+Effective Power Fo[Normal]+Effective Power Fo[Deboost]. If Physical Fo[non-HARQ]+Physical Fo[HARQ] is determined to be less than the maximum number of subchannels per symbol, and Effective Power Fo[non-HARQ]+Effective Power Fo[HARQ] is less than or equal to the maximum number of subchannels per symbol, the BS proceeds to step 608 where the BS estimates a transmission PDU[CID] following the current PDU[CID] according to the scheduling priority. However, if Physical Fo[non-HARQ]+Physical Fo[HARQ] is determined to be greater than or equal than the maximum number of subchannels per symbol or Effective Power Fo[non-HARQ]+Effective Power Fo[HARQ] is greater than to the maximum number of subchannels per symbol, the BS proceeds to step 654. Although the BS compares herein 'Physical Fo[non-HARQ]+Physical Fo[HARQ]' and 'Effective Power Fo[non-HARQ]+Effective Power Fo[HARQ]' with the maximum number of subchannels per symbol, the BS can also compare them with the total number [N] of slots to be allocated in all sub-data burst regions of the data burst allocation region of the current DL frame.

In step 654, the BS searches for a candidate PDU[CID]. The candidate PDU[CID] is equal to that shown in FIGS. 5A to 5C, so a description thereof will be omitted herein for simplicity.

As is apparent from the foregoing description, in configuring one DL frame, the present invention adjusts a size of the MAP to be allocated and a size of the data burst allocation region taking power boosting/deboosting into account when non-HARQ bursts and HARQ bursts coexist, thereby preventing the resource waste and improving the throughput. In addition, during DL resource allocation for a particular MS, the present invention allocates resources after determining the presence/absence of available slots for the DL_MAP_IE. That is, the present invention determines the possibility of DL_MAP_IE allocation, thereby contributing to the possible resource waste.

While the invention has been shown and described with reference to a certain preferred embodiments thereof, it will be understood by those skilled in the art that various changes in form and details may be made therein without departing from the spirit and scope of the invention as defined by the appended claims.

What is claimed is:

1. A method for configuring a downlink frame in a communication system, the method comprising:
    determining a first transmission Protocol Data Unit/Packet Data Unit (PDU) to be transmitted according to a scheduling priority;
    variably determining an amount of a data burst by calculating a sub-channel axis size of a first sub-region and a number of slots to be allocated in the first sub-region in an accumulated manner when the first PDU is allocated in the first sub-region;
    determining a size of a MAP region according to an amount of the data burst;
    setting up the MAP region in a downlink frame region according to the determined size of the MAP region including allocation information of a data burst; and transmitting the data burst over a data burst allocation region set up in a remaining region except for the MAP region in the downlink frame region, wherein the data burst includes at least one PDU having the same Modulation and Coding Scheme (MCS) level, or is a data burst generated by concatenating PDUs of a same Mobile Station (MS), and wherein the data burst allocation region includes a non-Hybrid Automatic Retransmit reQuest (non-HARQ) region and a HARQ region, the non-HARQ region is used for transmitting non-HARQ data bursts, the HARQ region is used for transmitting non-HARQ data bursts, and the first sub-region is the non-HARQ region or HARQ region.

2. The method of claim 1, further comprising:
calculating a number of slots to be allocated in a second sub-region, and a total number of slots to be allocated in all sub-regions of the downlink frame in an accumulated manner every time the new PDU is allocated in the second sub-region according to the scheduling priority, wherein the second sub-region is the non-HARQ region or HARQ region.

3. The method of claim 1, wherein the step of variably determining an amount of the data burst comprises:
calculating a total number of slots to be allocated in all sub-regions of the downlink frame; and
fragmenting the first PDU when a total number of the slots is greater than a maximum number of slots allocable in all sub-regions of the downlink frame.

4. The method of claim 1, wherein the step of variably determining an amount of the data burst comprises:
determining whether a second PDU transmitted before transmission of the first PDU has the same MCS level of the first PDU when the first sub-region is the non-HARQ region, determining whether the second PDU has the same MS identifier (ID) as the first PDU, and when they do not have the same MS ID, allowing the first PDU to belong to the data burst, and increasing the allocation information of the data burst by one when the first PDU and the second PDU do not have the same MCS level.

5. The method of claim 1, wherein the step of variably determining an amount of the data burst comprises:
when the first sub-region is the HARQ region, determining whether a second PDU has the same MS identifier (ID) as the first PDU, and when they do not have the same MS ID, not allowing the first PDU to belong to a first data burst, and increasing a downlink HARQ sub-burst size included in the allocation information by one; and
concatenating the first PDU and the second PDU when they have the same MS ID.

6. The method of claim 5, further comprising:
increasing a Num Downlink Interval Usage Code (DIUC) Change size by one for new DIUC allocation information included in the allocation information when the first PDU does not have the same MCS level as the second PDU.

7. The method of claim 1, wherein the step of variably determining an amount of the data burst comprises:
calculating a sum of sub-channel axis sizes of all sub-regions of the data burst allocation region including sub-channel axis sizes allocated to the first PDU in the first sub-region;
determining whether the sum of the sub-channel axis sizes is less than a maximum number of sub-channels per symbol;

determining a next transmission PDU according to scheduling priority when the sum of the sub-channel axis sizes is less than the maximum number of sub-channels per symbol; and determining, as a candidate PDU, a PDU with the highest MCS level among the PDUs left in a memory queue to be transmitted to the MS when the sum of sub-channel axis sizes is greater than or equal to the maximum number of sub-channels per symbol, and variably determining an amount of the data burst using the determined candidate PDU.

8. The method of claim 7, wherein the sum of the sub-channel axis sizes is calculated using:
Physical Fo[region]=ceil(N[region]/Number of Data burst Symbols)
where Physical Fo[region] denotes a sub-channel axis size of each of the sub-regions included in the data burst allocation region, each of the sub-regions includes a HARQ region and a non-HARQ region, N[region] denotes a total number of slots to be allocated in each of the sub-regions, and ceil(x) refers to a mathematical function for making an integer value by rounding up a decimal point of x.

9. The method of claim 1, wherein when the first sub-region is a non-HARQ region, the first sub-region includes a boosting/deboosting region where power is boosted/deboosted to a predetermined power level, and a normal region where the current power is maintained.

10. The method of claim 9, wherein the step of variably determining an amount of the data burst comprises:
comparing a received Carrier-to-Interference plus Noise Ratio (CINR) of an MS to which the first PDU is to be transmitted, with threshold values of the boosting/deboosting region and the normal region, and depending on the comparison result, determining a sub-region over which the first PDU is to be transmitted, among the boosting/deboosting region and the normal region.

11. The method of claim 10, further comprising:
determining whether the first PDU is included in the boosting region;
calculating a total number N(boost) of slots to be allocated in the boosting region when the first PDU is included in the boosting region; and
calculating a power slot Effective Power Slot(boost) of the boosting region using Effective Power Slot(boost)=2 * N(boost).

12. The method of claim 11, further comprising:
determining whether the first PDU is included in the normal region when the first PDU is not included in the boosting region;
when the first PDU is included in the normal region, calculating a total number N(normal) of slots to be allocated in the normal region; and
calculating a power slot Effective Power Slot(normal) of the normal region using Effective Power Slot(normal)= N(normal).

13. The method of claim 12, wherein further comprising:
calculating a total number N(deboost) of slots to be allocated in the deboosting region when the first PDU is not included in the normal region; and
calculating a power slot Effective Power Slot(deboost) of the deboosting region using Effective Power Slot(deboost)=0.5*N(deboost).

14. The method of claim 4, wherein the allocation information of the first region is a downlink MAP information element (DL_MAP_IE) indicating data burst allocation information of the non-HARQ region.

15. The method of claim 5, further comprising:
calculating a total number N(HARQ) of slots to be allocated in the HARQ region; and
calculating a power slot Effective Power Slot(HARQ) of the second sub-region using Effective Power Slot (HARQ)=2 * N(boost).

16. The method of claim 15, further comprising:
determining whether a second PDU transmitted before transmission of the first PDU has the same MCS level as the first PDU;
concatenating the first PDU and the second PDU into a first data burst when the second PDU has the same MCS level as the first PDU; and
not including the first PDU in the first data burst, and increasing data burst allocation information of the first region by one when the second PDU does not have the same MCS level as the first PDU.

17. The method of claim 5, wherein the allocation information is a downlink HARQ sub-burst information element (DL HARQ Sub-burst_IE) indicating data burst allocation information of the HARQ region.

18. The method of claim 1, further comprising:
calculating a number of sub-channels of the MAP region, a number of symbols of the MAP region, a number of symbols of the data burst, and a maximum number of slots allocable in the downlink frame;
determining whether a first sum value obtained by calculating and summing sub-channel axis sizes whose powers are considered in all sub-regions of the downlink frame including the first sub-region is less than or equal to the maximum number of sub-channels per symbol, and determining whether a second sum value obtained by calculating a total number of slots to be allocated in all sub-regions of the downlink frame including a number of slots to be allocated in the first sub-region is less than the maximum number of sub-channels per symbol;
determining a next transmission PDU be transmitted according to the scheduling priority when both conditions are satisfied; and
determining, as a next transmission PDU, the PDU with the highest MCS level left in a memory queue, to be transmitted to the MS, except for the PDUs determined to be transmitted according to the scheduling priority when the first sum value is greater than the maximum number of sub-channels per symbol or the second sum value is greater than the maximum number of sub-channels per symbol.

19. The method of claim 18, wherein the first sum value is calculated using Effective Power Fo(region)=ceil(Effective Power Slot(region)/Number of Data Symbols),
where Effective Power Fo(region) denotes a power-considered sub-channel axis size of each of the sub-regions included in the data burst allocation region, each of the sub-regions is the HARQ region or the non-HARQ region, the HARQ region includes a boosting region, a deboosting region and normal region, and ceil(x) refers to a mathematical function for making an integer value by rounding up a decimal point of x.

20. The method of claim 18, wherein the second sum value is calculated using Physical Fo[region]=ceil(N[region]/Number of Data Symbols),
where Physical Fo[region] denotes a sub-channel axis size of each of the sub-regions included in the data burst allocation region, each of the sub-regions includes the HARQ region or the non-HARQ region, the non-HARQ region includes the boosting region, the deboosting region and normal region, N[Region] denotes the total number of slots to be allocated in a corresponding region, and ceil(x) refers to a mathematical function for making an integer value by rounding up a decimal point of x.

21. An apparatus for configuring a downlink frame in a communication system, the apparatus comprising:
a frame configuring unit for:
determining a first transmission Protocol Data Unit/Packet Data Unit (PDU) to be transmitted according to a scheduling priority;
variably determining an amount of a data burst by calculating a sub-channel axis size of a first sub-region and a number of slots to be allocated in the first sub-region in an accumulated manner when the first PDU is allocated in the first sub-region;
determining a size of a MAP region according to an amount of the data burst;
setting up the MAP region in a downlink frame region according to the determined size of the MAP region including allocation information of a data burst; and
transmitting the data burst over a data burst allocation region set up in a remaining region except for the MAP region in the downlink frame region,
wherein the data burst includes at least one PDU having the same Modulation and Coding Scheme (MCS) level, or is a data burst generated by concatenating PDUs of a same Mobile Station (MS), and
wherein the data burst allocation region includes a non-Hybrid Automatic Retransmit reQuest (non-HARQ) region and a HARQ region, the non-HARQ region is used for transmitting non-HARQ data bursts, the HARQ region is used for transmitting non-HARQ data bursts, and the first sub-region is the non-HARQ region or HARQ region.

22. The apparatus of claim 21, wherein the frame configuring unit:
calculates a number of slots to be allocated in a second sub-region, and a total number of slots to be allocated in all sub-regions of the downlink frame in an accumulated manner every time the new PDU is allocated in the second sub-region according to the scheduling priority,
wherein the second sub-region is the non-HARQ region or HARQ region.

23. The apparatus of claim 21, wherein the frame configuring unit:
calculates a total number of slots to be allocated in all sub-regions of the downlink frame; and
fragments the first PDU when a total number of the slots is greater than a maximum number of slots allocable in all sub-regions of the downlink frame.

24. The apparatus of claim 21, wherein the frame configuring unit:
determines whether a second PDU transmitted before transmission of the first PDU has the same MCS level of the first PDU when the first sub-region is the non-HARQ region, determines whether the second PDU has the same MS identifier (ID) as the first PDU, and when they do not have the same MS ID, allows the first PDU to belong to the data burst, and increases the allocation information of the data burst by one when the first PDU and the second PDU do not have the same MCS level.

25. The apparatus of claim 23, wherein the frame configuring unit:
when the first sub-region is the HARQ region, determines whether a second PDU has the same MS identifier (ID) as the first PDU, and when they do not have the same MS ID, allows the first PDU to belong to the first data burst, and increases a downlink HARQ sub-burst size included in the allocation information by one; and concatenates the first PDU and the second PDU when they have the same MS ID.

26. The apparatus of claim 25, wherein the frame configuring unit:

increases a Num Downlink Interval Usage Code (DIUC) Change size by one for new DIUC allocation information included in the allocation information when the first PDU does not have the same MCS level as the second PDU.

27. The apparatus of claim 21, wherein the frame configuring unit:

calculates a sum of sub-channel axis sizes of all sub-regions of the data burst allocation region including sub-channel axis sizes allocated to the first PDU in the first sub-region;

determines whether the sum of the sub-channel axis sizes is less than a maximum number of sub-channels per symbol;

determines a next transmission PDU according to the scheduling priority when the sum of the sub-channel axis sizes is less than the maximum number of sub-channels per symbol; and determines, as a candidate PDU, a PDU with the highest MCS level among the PDUs left in a memory queue to be transmitted to the MS when the sum of sub-channel axis sizes is greater than or equal to the maximum number of sub-channels per symbol, and variably determines an amount of the data burst using the determined candidate PDU.

28. The apparatus of claim 27, wherein the frame configuring unit:

calculates the sum of the sub-channel axis sizes using Physical Fo[region]=ceil(N[region]/Number of Data burst Symbols), where Physical Fo[region] denotes a sub-channel axis size of each of the sub-regions included in the data burst allocation region, each of the sub-regions includes an HARQ region and a non-HARQ region, N[region] denotes a total number of slots to be allocated in each of the sub-regions, and ceil(x) refers to a mathematical function for making an integer value by rounding up a decimal point of x.

29. The apparatus of claim 21, wherein when the first sub-region is the non-HARQ region, the first sub-region includes a boosting/deboosting region where power is boosted/deboosted to a predetermined power level, and a normal region where the current power is maintained.

30. The apparatus of claim 29, wherein the frame configuring unit:

compares a received Carrier-to-Interference plus Noise Ratio (CINR) of a Mobile Station (MS) to which the first PDU is to be transmitted, with threshold values of the boosting/deboosting region and the normal region, and determines a sub-region including the boosting/deboosting region and the normal region where a first PDU is to be transmitted.

31. The apparatus of claim 30, wherein the frame configuring unit:

determines whether the first PDU is included in the boosting region;

calculates a total number N(boost) of slots to be allocated in the boosting region when the first PDU is included in the boosting region; and calculates a power slot Effective Power Slot(boost) of the boosting region using Effective Power Slot(boost)=2 * N(boost).

32. The apparatus of claim 31, wherein the frame configuring unit:

determines whether the first PDU is included in the normal region when the first PDU is not included in the boosting region;

calculates a total number N(normal) of slots to be allocated in the normal region when the first PDU is included in the normal region; and calculates a power slot Effective Power Slot(normal) of the normal region using Effective Power Slot(normal)=N(normal).

33. The apparatus of claim 32, wherein the frame configuring unit:

calculates a total number N(deboost) of slots to be allocated in the deboosting region when the first PDU is not included in the normal region; and calculates a power slot Effective Power Slot(deboost) of the deboosting region using Effective Power Slot(deboost)=0.5*N(deboost).

34. The apparatus of claim 24, wherein the allocation information of the first region is a downlink MAP information element (DL_MAP_IE) indicating data burst allocation information of the non-HARQ region.

35. The apparatus of claim 25, wherein the frame configuring unit:

calculates a total number N(HARQ) of slots to be allocated in the HARQ region; and calculates a power slot Effective Power Slot(HARQ) of the second sub-region using Effective Power Slot(HARQ)= 2 *N(boost).

36. The apparatus of claim 25, wherein the allocation information of the first region is a downlink HARQ sub-burst information element (DL HARQ Sub-burst_IE) indicating data burst allocation information of the HARQ region.

37. The apparatus of claim 21, wherein the frame configuring unit:

calculates a number of sub-channels of the MAP region, a number of symbols of the MAP region, a number of symbols of the data burst, and a maximum number of slots allocable in the downlink frame;

determines whether a first sum value obtained by calculating and summing sub-channel axis sizes whose powers are considered in all sub-regions of the downlink frame including the first sub-region is less than or equal to the maximum number of sub-channels per symbol, and determines whether a second sum value obtained by calculating a total number of slots to be allocated in all sub-regions of the downlink frame including a number of slots to be allocated in the first sub-region is less than the maximum number of sub-channels per symbol;

determines a next transmission PDU to be transmitted according to the scheduling priority when both conditions are satisfied; and determines, as a next transmission PDU, the PDU with the highest MCS level left in a memory queue, to be transmitted to the MS, except for the PDUs determined to be transmitted according to the scheduling priority, when the first sum value is greater than the maximum number of sub-channels per symbol or the second sum value is greater than the maximum number of sub-channels per symbol.

38. The apparatus of claim 37, wherein the first sum value is calculated using Effective Power Fo(region)=ceil(Effective Power Slot(region)/Number of Data Symbols), where Effective Power Fo(region) denotes a power-considered sub-channel axis size of each of the sub-regions included in the data burst allocation region, each of the sub-regions is the HARQ region or the non-HARQ region, the HARQ region includes a boosting region, a deboosting region, and a normal region, and ceil(x) refers to a mathematical function for making an integer value by rounding up a decimal point of x.

39. The apparatus of claim 37, wherein the second sum value is calculated using Physical Fo[region]=ceil(N[region]/Number of Data Symbols), where Physical Fo[region] denotes a sub-channel axis size of each of the sub-regions included in the data burst allocation region, each of the sub-regions includes the HARQ region and the non-HARQ region, N[Region] denotes the total number of slots to be allocated in a corresponding region, the non-HARQ region includes the boosting region, the deboosting region and normal region, and ceil(x) refers to a mathematical function for making an integer value by rounding up a decimal point of x.

\* \* \* \* \*